(12) United States Patent
Takakuwa et al.

(10) Patent No.: US 6,284,084 B1
(45) Date of Patent: Sep. 4, 2001

(54) METHOD OF MANUFACTURING INFORMATION RECORD CARRIER

(75) Inventors: Atsushi Takakuwa; Takao Nishikawa, both of Shiojiri (JP); Satoshi Nebashi, Cambridge (GB)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/194,226

(22) PCT Filed: Mar. 13, 1998

(86) PCT No.: PCT/JP98/01092

§ 371 Date: Nov. 18, 1998

§ 102(e) Date: Nov. 18, 1998

(87) PCT Pub. No.: WO98/41984

PCT Pub. Date: Sep. 24, 1998

(30) Foreign Application Priority Data

Mar. 18, 1997 (JP) .................................................. 9-065182

(51) Int. Cl.⁷ .............................. B32B 31/28; B29C 35/08
(52) U.S. Cl. ...................... 156/245; 156/247; 156/275.5; 264/496; 264/259; 264/299
(58) Field of Search .................................. 156/245, 247, 156/275.5, 275.7; 430/321; 264/1.38, 447, 496, 259, 299, 319

(56) References Cited

U.S. PATENT DOCUMENTS 5,273,598 * 12/1993 Higasihara et al. ............... 156/275.7
5,330,880 * 7/1994 Horigome et al. .................... 430/321
5,932,051 * 8/1999 Mueller et al. ....................... 156/228
5,951,806 * 9/1999 Amo et al. ......................... 156/273.5

FOREIGN PATENT DOCUMENTS

| 56-34429 | 4/1981 | (JP) . |
| 60-224532 | 11/1985 | (JP) . |
| 61-32239 | 2/1986 | (JP) . |
| 61-209140 | 9/1986 | (JP) . |
| 62-119753 | 6/1987 | (JP) . |
| 63-92438 | 4/1988 | (JP) . |
| 2-37538 | 2/1990 | (JP) . |
| 2-51434 | 2/1990 | (JP) . |
| 4-157638 | 5/1992 | (JP) . |
| 4-311833 | 11/1992 | (JP) . |

* cited by examiner

Primary Examiner—Michael W. Ball
Assistant Examiner—Michael A. Tolin
(74) Attorney, Agent, or Firm—Harness, Dickey & Pierce, P.L.C.

(57) ABSTRACT

In order to manufacture, with high productivity, an information record carrier capable of recording information at a high density, in a method in which a curable resin is coated on a master (1) having a pattern corresponding to the required information, and the master and a substrate of the information record carrier are bonded to transfer the pattern on the master to the substrate of the information record carrier, a projection (2), a hole, a recess, or the like is provided on the surface of the master (1) so as to engage with the substrate of the information record carrier.

7 Claims, 3 Drawing Sheets

METHOD OF MANUFACTURING INFORMATION RECORD CARRIER

TECHNICAL FIELD

The present invention relates to a method of manufacturing an optical disk such as CD-ROM or the like, and other information record carriers.

BACKGROUND ART

In the manufacture of an optical disk such as CD-ROM or the like and other information record carriers, conventionally, a stamper (mold) for producing a disk substrate is formed in a mastering step, a resin disk substrate is molded by an injection molding method using the stamper, and a recording film and reflecting film are deposited on the disk substrate.

In the disk substrate, an irregular shape must be formed in the recording surface thereof in correspondence with recording data. At present, an Ni master formed by Ni plating is used as the stamper having a surface shape for molding the irregular shape, and a molten resin is injected into a mold as the master by the injection molding method and solidified by cooling to form the disk substrate.

On the other hand, a method other than the above injection molding method, i.e., a so-called 2P method, has been proposed, which comprises coating an ultraviolet curable resin on the surface of the master or the resin disk substrate having transmissivity, bonding the master and the disk substrate with the ultraviolet curable resin therebetween, irradiating the disk substrate side with ultraviolet rays to cure the resin, and then separating the disk substrate from the master together with the cured resin layer (Japanese Unexamined Patent Publication Nos. 56-37836 and 1-180328, etc.) The 2P method has the advantage that since a liquid resin is used, duplication has excellent fidelity, and the stamper hardly deteriorates.

Japanese Unexamined Patent Publication No. 4-311833 discloses a method which uses a master formed by finely processing a semiconductor wafer of silicon or the like, or a quartz or glass surface by a known photolithographic process, in place of the master made of Ni.

In both the injection molding method and the 2P method, an optical disk and other information record carriers are required to have an amount of eccentricity with high precision. In order to reproduce a micro mark on the disk substrate, it is necessary to converge a light beam on the mark and irradiate the mark with the light beam. With the disk substrate having high eccentricity, a high degree of precession of the rotational shaft of a drive, or the like, deviation occurs in the tracks in the radial direction of the disk with rotation, and thus the laser spot is deviated from the tracks and crosses many tracks, thereby making correct recording and reproduction impossible. The amount of eccentricity of the disk substrate is determined by the position deviation between the master and the disk substrate during molding or transfer of information of the master surface. In order to suppress eccentricity, the dimensions of the disk substrate must be precisely controlled in molding. For a master such as the Ni master, which can easily be processed, a reference hole is formed by press working so that molding is carried out on the basis of the reference hole to decrease eccentricity. On the other hand, in a master made of silicone, quartz or glass, which is processed with difficulties, the processing precision deteriorates, and thus the eccentricity of the disk substrate cannot be easily decreased. There is also the problem of the high possibility of breaking the master due to the stress applied in processing. Therefore, under present conditions, the technique of finely processing semiconductors cannot be effectively utilized, and it is difficult to attempt to increase the recording density of the duplicated optical disk.

Accordingly, an object of the present invention is to solve the above problems, and realize manufacture of an information record carrier which is capable of improving the productivity of an optical disk and other information record carriers, and increasing the recording density thereof. Particularly, an object of the present invention is to provide a method of manufacturing an information record carrier with high productivity, which comprises coating a photosetting resin or a thermosetting resin on a substrate or a master, bonding the substrate and the master, and curing the photosetting resin or thermosetting resin to transfer the information of the master to the substrate.

SUMMARY OF THE INVENTION

In order to achieve the object, the present invention provides a method of manufacturing an information recording medium comprising the steps of coating a curable resin on a master or a disk substrate of an information recording medium, and pressing the substrate and the master, wherein one of the disk substrate and the master has a projection, and the other has a recess or hole which can be engaged with the projection so that pressing is carried out by engaging the projection and the recess or hole. The master has a pattern for permitting recording of information on the information recording medium. In the pressing step, the pattern is transferred to the information recording medium. The pressing step represents the step of pressing one of the master and the substrate on the other. The present invention facilitates alignment between the master and the substrate in the pressing step. With the projection and the recess or the like formed at a position and a height with high precision, it is possible to manufacture the information recording medium with less eccentricity.

A method of manufacturing an information record carrier of the present invention comprises the steps of coating a photosetting resin or thermosetting resin on a substrate or a master, bonding the substrate and the master, and curing the photosetting resin or thermosetting resin to transfer the information of the master to the substrate, wherein a projection is provided on the surface of the master.

In the method of manufacturing an information record carrier of the present invention, the projection is provided by bonding it to the surface of the master with an adhesive.

In the method of manufacturing an information record carrier of the present invention, the adhesive is a photosetting resin, a thermosetting resin, or an instantaneous adhesive.

In the method of manufacturing an information record carrier of the present invention, the projection is provided by bonding it to the surface of the master using magnetic force.

A method of manufacturing an information record carrier of the present invention comprises the steps of coating a photosetting resin or thermosetting resin on a substrate or a master, bonding the substrate and the master, and curing the photosetting resin or thermosetting resin to transfer the information of the master to the substrate, wherein a hole or recess is provided in the master.

In the method of manufacturing an information record carrier of the present invention, the hole or recess is provided by laser processing.

In the method of manufacturing an information record carrier of the present invention, as the laser, an excimer laser, a YAG laser, a $CO_2$ laser or a semiconductor laser is used.

In the method of manufacturing an information record carrier of the present invention, the hole or recess is provided by discharge processing.

In the method of manufacturing an information record carrier of the present invention, the hole or recess is provided by cutting.

In the method of manufacturing an information record carrier of the present invention, the hole or recess is provided by dry etching or wet etching.

In the method of manufacturing an information record carrier of the present invention, the master is made of silicon, quartz or glass.

By providing the projection on the surface of the master, alignment between the master and the substrate can be easily and precisely performed, thereby permitting manufacture of an information record carrier with less eccentricity and good productivity. Since the eccentricity is decreased, the manufacturing margin is widened, and the excellent effect of achieving higher recording density is exhibited.

BEST MODE FOR CARRYING OUT THE INVENTION

A photomagnetic recording medium of the present on is described in detail below with reference to the preferred embodiments shown in the attached drawings.

Embodiment 1

Figure 1A:
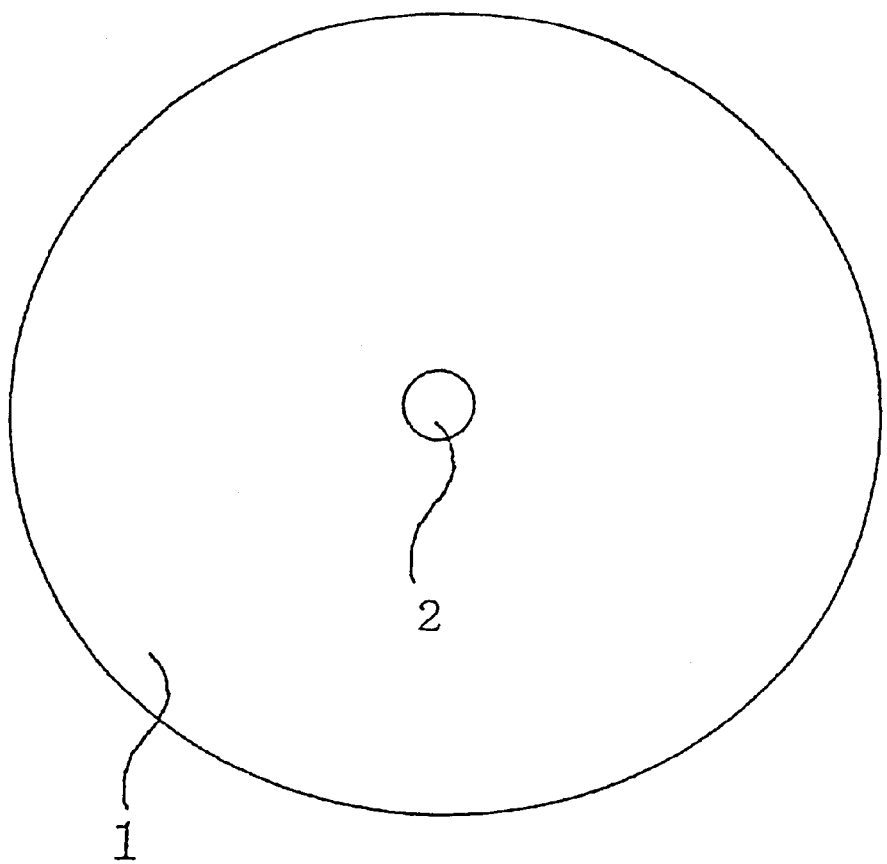
FIG. 1 is a drawing showing the top and the side of a master comprising a projection provided on the surface thereof in accordance with an embodiment of the present invention.
Figure 1B:
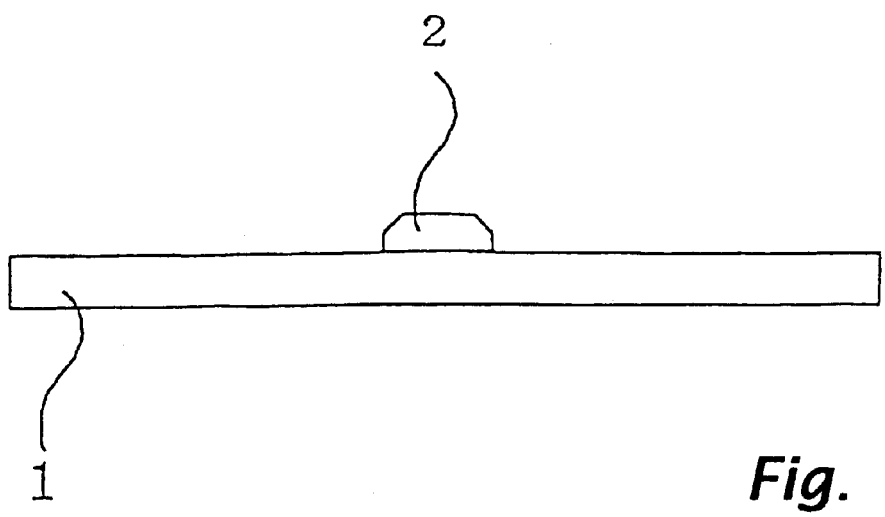

FIG. 1(a) is a top view of a master comprising a projection provided on the surface thereof in accordance embodiment of the present invention, FIG. 1(b) is a side view of the master comprising a projection provided on the surface in accordance with the embodiment of the present invention, and FIG. 2 is a sectional view showing the steps or a method of manufacturing an information record carrier. In this embodiment, manufacture of an optical disk is described. In FIG. 2, a protective film, a reflection film, etc. are omitted.

In FIG. 1, reference numeral 1 denotes a master. The master 1 can be formed by processing silicon and other various materials such as quartz, glass, resin, and the like. Although the master 1 is thin and brittle, and is thus easily broken, the master 1 is widely used as a semiconductor, particularly as a silicon substrate, and thus has the advantages that distribution in the market is good, and that the technique of forming a submicron pattern in semiconductor manufacture can be directly applied. Particularly, a master in which a deposited photoresist is exposed to light to form a pattern in correspondence with recording data is preferable for increasing the recording density. In the surface of the master 1 is formed an irregular shape comprising a groove, pits, or the like by a method comprising forming a resist mask by a known photolithographic technique, and then etching the resist mask, as disclosed in, for example, Japanese Unexamined Patent Publication No. 4-311833.

On the surface of the master 1 is provided a projection 2. The shape of the projection 2 is determined by the shape of a disk substrate 3. The disk substrate 3 is positioned by fitting the center hole of the disk substrate to the outer diameter of the projection 2. Therefore, the amount of eccentricity changes with the clearance between the inner diameter of the center hole of the disk substrate 3 and the outer diameter of the projection 2. The clearance may be determined in accordance with the required amount of eccentricity. As shown in FIG. 1(b), the top of the projection 2 is tapered so as to facilitate engagement even if the clearance is small. By bonding the projection 2 with an adhesive, the projection 2 can be securely easily provided on the surface of the master 1 within a short time. As the adhesive, a commercial instantaneous adhesive, a photosetting resin or a thermosetting resin can be used. Alternatively, the projection 2 may be magnetically bonded as a magnetic material. In this case, the projection 2 can be easily detached, and causes no possibility of contamination of the master 1 with the adhesive. The projection 2 is provided at the predetermined position on the basis of an alignment mark previously provided on the surface of the master 1. Since the amount of eccentricity is increased even by deviating the position of the projection 2, the projection 2 is positioned with high precision by using a microscope, a CCD camera, or the like.

Figure 2A:
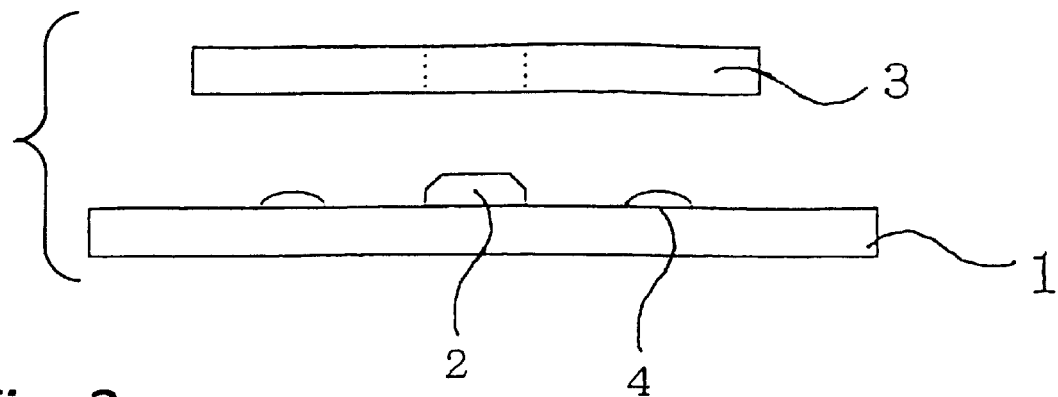
FIG. 2 is a sectional view showing the steps of a method of manufacturing an information record carrier in accordance with an embodiment of the present invention.
Figure 2B:
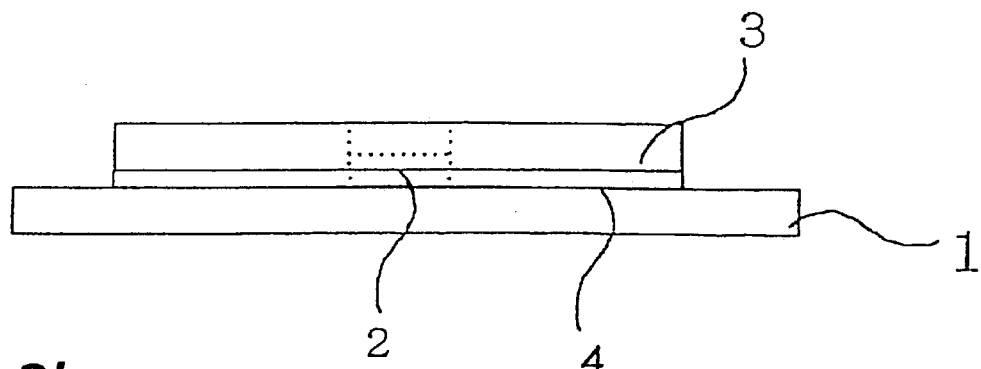
Figure 2C:
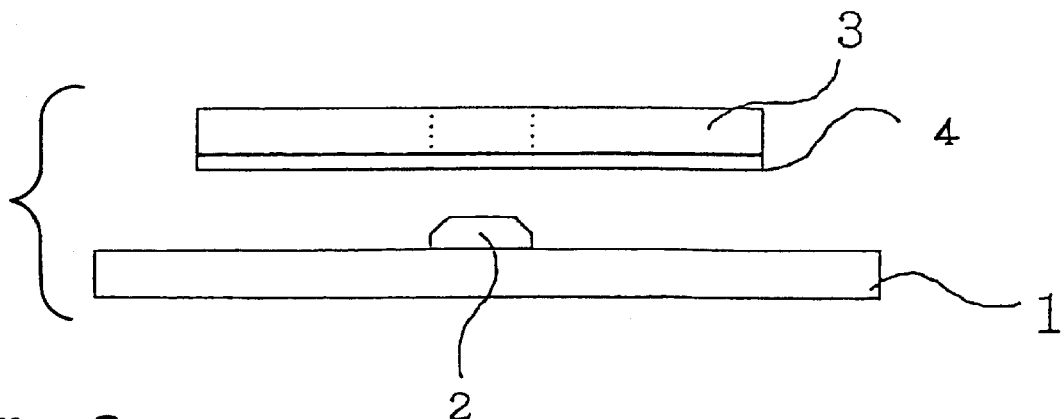

An optical disk according to the present invention is manufactured by the steps below. First, the surface of the disk substrate 3 is activated for enhancing adhesion between the disk substrate 3 and a resin layer 4 in the plasma processing step. As the disk substrate 3, a resin substrate of amorphous polyolefin, polycarbonate, acrylic resin, or the like, a glass substrate or other materials are used. Next, the surface of the master 1 is coated with a photosetting resin for forming the resin layer 4, as shown in FIG. 2(a). As the coating method, the photosetting resin may be coated on the disk substrate 3, not the master 1, or the surfaces of both the master 1 and the disk substrate 3 may be coated. As a resin material which constitutes the resin layer 4, a resin material suitable for the final product must be used. The resin material is not limited to the photosetting resin, and any resins such as thermosetting resins, thermoplastic resins, and the like, and other materials may be used as long as a fine structure can be consequently transferred. Particularly, in the use of a photosetting resin or thermosetting resin, since the resin is a general-purpose resin, high productivity can be obtained, and cost reduction can be realized. Such a resin also has the excellent property of transferring a fine pattern. Next, as shown in FIG. 2(b), the disk substrate 3 and the master 1 are bonded to spread the resin over the entire surfaces thereof, to form the resin layer 4. Next, the resin layer 4 is cured by irradiation of ultraviolet rays. Finally, the disk substrate 3 is separated from the master 1, as shown in FIG. 2(c). In separating the disk substrate 3, the disk substrate 3 is separated in the interface between the resin layer 4 and the master 1, with the resin layer 4 fixed to the bottom of the disk substrate 3. This is because the materials have been previously selected so that the adhesion between the disk substrate 3 and the resin layer 4 is higher than that between the master 1 and the resin layer 4.

As a result of measurement of the amount of eccentricity of the optical disk substrate manufactured by the above steps, the amount was less than 50 microns, and stable recording and reproduction could be performed without any problem in the tracking operation. In repetitions of molding, the strength of the master 1 did not deteriorate, and thus the master 1 was not broken.

Although, in this embodiment, the optical disk is described as an example, other information record carriers such as a magnetic disk and the like exhibit the same results.

Embodiment 2

Figure 3:
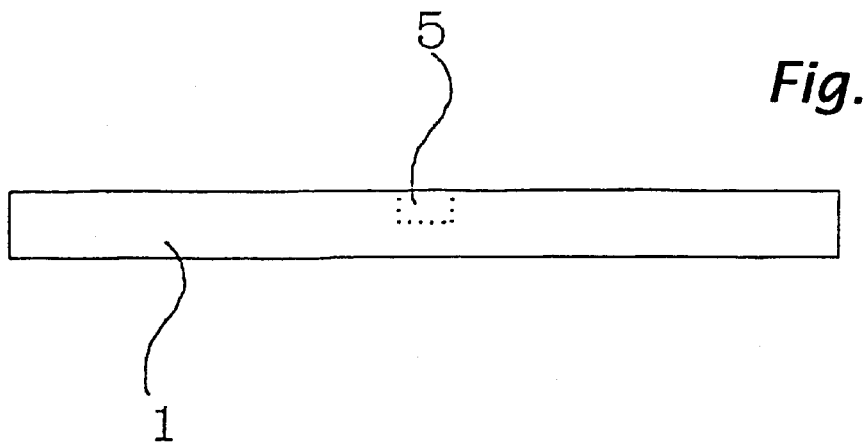
FIG. 3 is a side view of a master comprising a recess in accordance with an embodiment of the present invention.
Figure 4:
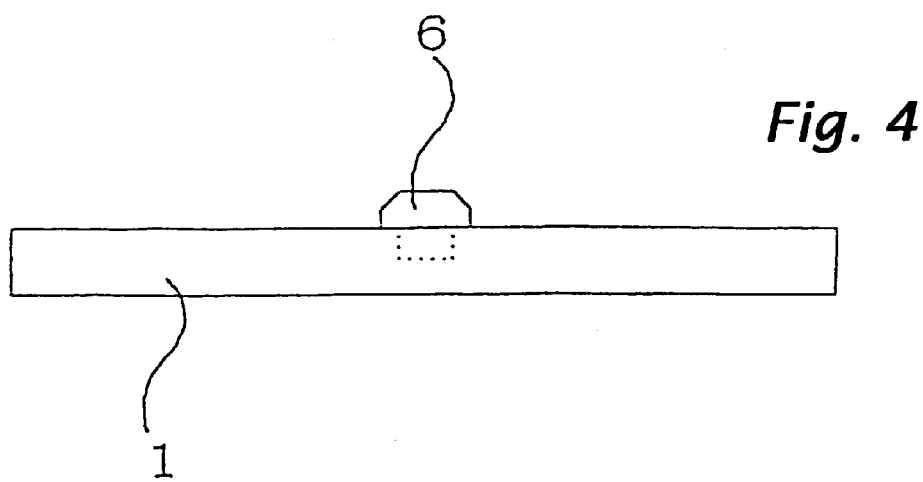
FIG. 4 is a sectional view showing a step of a method of manufacturing an information record carrier in accordance with an embodiment of the present invention.
Figure 5:
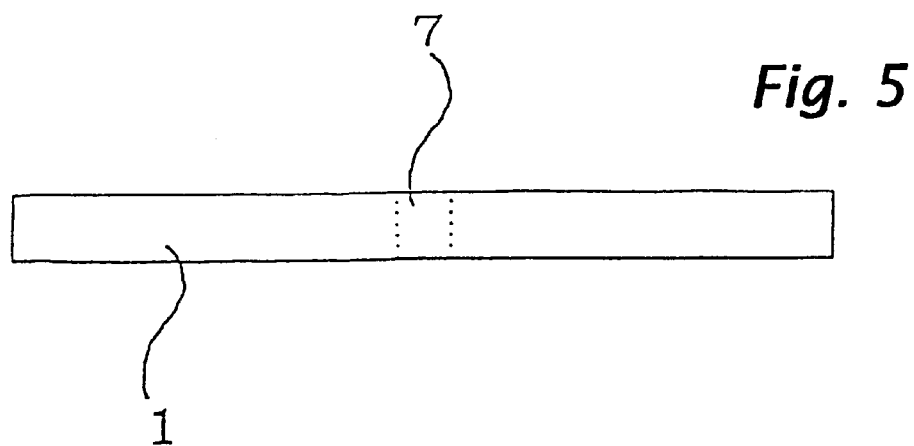
FIG. 5 is a side view of a master comprising a hole in accordance with an embodiment of the present invention.

FIG. 3 is a side view of a master comprising a recess in accordance with an embodiment of the present invention, FIG. 4 is a sectional view showing a step of the process for manufacturing an information record carrier, and FIG. 5 is a side view of a master comprising a hole in accordance with an embodiment of the present invention.

In the surface of the master 1 is provided a recess 5. A positioning jig 6 is further provided on the surface to engage with the recess 5, as shown in FIG. 4. The disk substrate 3 is positioned by fitting the outer diameter of the jig 6 to the center hole of the disk substrate 3. The subsequent steps are the same as Embodiment 1. Therefore, the amount of eccentricity changes with the clearance between the inner diameter of the center hole of the disk substrate 3 and the outer diameter of the positioning jig 6. The clearance may be determined according to the required amount of eccentricity. The top of the positioning jig 6 is tapered, as shown in FIG. 4, so as to facilitate engagement even if there is no clearance. Even if a through hole 7 is provided in place of the recess 5, as shown in FIG. 5, the same results are exhibited.

The hole 7 or the recess 5 can be provided at the predetermined position by laser processing. As a laser, an excimer laser, a TAG laser or a CO2 laser, a semiconductor laser and the like can be used. Any one of the lasers permits high precision processing with out damaging the master 1. For example, when the hole 7 is formed in a master made of silicon, quartz, or glass by pressing, as in the conventional Ni master, the master of silicon, quartz or glass is brittle and is thus easily broken. However, the above method permits processing without breaking the master. The hole 7 or the recess 5 can also be provided by discharge processing or cutting. The hole 7 or the recess 5 can also be provided by dry etching or wet etching. Any one of the methods enables high precision processing with out damaging the master 1. In order to provide the hole 7 or the recess 5, a plurality of means comprising rough processing by discharge processing, and then fine processing by cutting can be used for processing with high precision.

An optical disk is manufactured by the same method as Embodiment 1. As a result of measurement of the amount of eccentricity of the optical disk substrate manufactured by the above method, the amount was less than 50 microns, and stable recording and reproduction could be performed without any problem in the tracking operation. In repetitions of molding, the strength of the master 1 did not deteriorate, and thus the master 1 was not broken.

Although, in this embodiment, the optical disk is described as an example, other information record carriers such as a magnetic disk and the like exhibit the same results.

What is claimed is:

1. A method of manufacturing an information record carrier comprising:

providing a substrate having a center hole;

providing a master disc;

providing an alignment mechanism on said master disc wherein the alignment mechanism has a tapered end portion and a straight wall base portion, said alignment mechanism being bonded to a surface of said master disc by one of the group consisting of adhesive and magnetic force;

coating at least one of said substrate and said master disc with a resin, using said alignment to control an eccentricity of said substrate relative to said master disc; and curing said resin such that information of said master disc is transferred to said substrate by way of said resin.

2. The method of claim 1 wherein said adhesive further comprises one of the group consisting of photosetting resin, thermosetting resin and instantaneous adhesive.

3. A method of manufacturing an information record carrier comprising the steps of:

providing a master having a projection bonded to a surface of the master with an adhesive, the projection having a tapered end portion and a straight wall base portion;

coating a resin on a substrate or the master;

disposing the substrate on the surface of the master by aligning the projection of the master with a center hole of the substrate; and curing the resin to transfer information of the master to the substrate;

wherein the tapered portion has an outer diameter that is less than an inner diameter of the center hole of the substrate for facilitating insertion of said projection into said center hole and the straight wall portion of projection has an outer diameter that is substantially equal to the inner diameter of the center hole of the substrate for suppressing an eccentricity of the information record carrier.

4. The method of manufacturing an information record carrier according to claim 3, wherein the adhesive for bonding the projection to the master is a photosetting resin.

5. The method of manufacturing an information record carrier according to claim 3 wherein the master comprises silicon, quartz, or glass.

6. The method of claim 3 wherein said straight wall portion of said projection is in contact with the center hole of the substrate after the insertion.

7. The method of manufacturing an information record carrier according to claim 3, wherein the adhesive for bonding the projection to the master is a thermosetting resin.

* * * * *

UNITED STATES PATENT AND TRADEMARK OFFICE
CERTIFICATE OF CORRECTION

PATENT NO. : 6,284,084 B1
DATED : September 4, 2001
INVENTOR(S) : Atsushi Taskakuwa and Takao Nishikawa It is certified that error appears in the above-identified patent and that said Letters Patent is hereby corrected as shown below:

Column 3,
Line 41, delete "on" and insert -- invention -- therefor
Line 47, after "accordance" insert -- with an --
Line 52, "or" should be -- of --

Column 4,
Line 18, "securely" should be -- secured --

Column 5,
Line 34, "CO2" should be -- $CO_2$ --
Lines 36 and 45, "with out" should be -- without --

Column 6,
Line 35, "substrate;" should be -- substrate, --

Signed and Sealed this

Twenty-sixth Day of March, 2002

Attest:

*Attesting Officer*

JAMES E. ROGAN
*Director of the United States Patent and Trademark Office*